United States Patent [19]

Yan et al.

[11] Patent Number: 4,495,152
[45] Date of Patent: Jan. 22, 1985

[54] LEACH APPARATUS INCLUDING MEANS TO PROTECT ION EXCHANGE RESIN

[75] Inventors: Tsoung-yuan Yan, Philadelphia, Pa.; Raymond L. Lozano, Thoreau, N. Mex.

[73] Assignee: Mobil Oil Corporation, New York, N.Y.

[21] Appl. No.: 297,303

[22] Filed: Aug. 28, 1981

Related U.S. Application Data

[62] Division of Ser. No. 963,662, Nov. 24, 1978, Pat. No. 4,298,578.

[51] Int. Cl.³ ............................................. F04C 29/00
[52] U.S. Cl. .................................... 422/159; 422/189; 422/234
[58] Field of Search ............... 423/7, 16, 6; 422/159, 422/189, 234

[56] References Cited

U.S. PATENT DOCUMENTS

| | | | |
|---|---|---|---|
| 2,780,514 | 2/1957 | Lutz | 423/7 |
| 2,873,169 | 2/1959 | Seaborg et al. | 423/16 |
| 3,288,570 | 11/1966 | Henrickson | 423/6 |
| 4,024,215 | 5/1977 | Caropreso et al. | 423/16 |
| 4,098,691 | 7/1978 | Filby | 210/29 |
| 4,105,253 | 8/1978 | Showalter | 423/17 |
| 4,110,204 | 8/1978 | Farmer | 423/7 |
| 4,116,488 | 9/1978 | Hsueh et al. | 299/4 |
| 4,155,982 | 5/1979 | Hunkin et al. | 423/17 |

FOREIGN PATENT DOCUMENTS

| | | | |
|---|---|---|---|
| 2757208 | 7/1978 | Fed. Rep. of Germany | 423/7 |
| 910025 | 11/1962 | United Kingdom | 423/7 |
| 1115797 | 5/1968 | United Kingdom | 423/7 |

OTHER PUBLICATIONS

Merritt, "The Extractive Metallurgy of Uranium", pp. 247-248, Colorado School of Mines, (1971).
Hurst et al., "Progress and Problems of Recovering Uranium from Wet Process Phosphoric Acid", ORNL, paper presented at 26th Ann. Meeting, Fertilizer Industry Roundtable, Atlanta, Ga (Oct. 1976).

Primary Examiner—Edward A. Miller
Attorney, Agent, or Firm—A. J. McKillop; M. G. Gilman; Charles A. Malone

[57] ABSTRACT

An apparatus for recovering uranium and/or related values which include means for protecting ion-exchange resins in the recovery operation from oxidative degradation due to contact with hydrogen peroxide. A guard chamber is positioned in the elution circuit so that barren eluant, after it is stripped of its uranium and/or related values by treatment with hydrogen peroxide, will flow through the chamber. The guard chamber contains catalytic material, e.g. activated carbon, which decomposes hydrogen peroxide upon contact into water and oxygen. The barren eluant, after it passes through the catalytic material, is used to make up fresh eluant for reuse in the recovery method without the risk of the fresh eluant causing oxidative degradation of the resins.

5 Claims, 2 Drawing Figures

LEACH APPARATUS INCLUDING MEANS TO PROTECT ION EXCHANGE RESIN

This is a division of application Ser. No. 963,662 filed Nov. 24, 1978, now U.S. Pat. No. 4,298,578.

BACKGROUND OF THE INVENTION

The present invention relates to apparatus for recovering uranium and/or related values from an ore, either at the surface or in situ. More particularly, the present invention relates to apparatus for recovering uranium which includes means for protecting the ion-exchange resins used in the recovery operation from oxidative degradation caused by contact with hydrogen peroxide.

In a typical uranium recovery operation, uranium-bearing ore (either mined or in situ) is contacted with a leach solution which dissolves the uranium values from the ore. The pregnant leach solution is then flowed through one or more columns filled with a strong base, anionic, ion-exchange resin which adsorbs the uranium values from the leach solution. When the resin in a column is sufficiently loaded with uranium values, the flow of leach solution is switched to another column and a second solution or eluant is flowed through the loaded column to desorb the uranium values into the eluant, now called eluate when loaded with uranium values. Due to the eluant composition, the concentration of uranium value in the eluate will be greater than was the concentration in the leach solution. The eluate is then processed to precipitate and recover the uranium values. The barren eluate, now stripped of uranium values, is made up with chemicals to form fresh eluant for recycle in the operation.

In known commercial operations where the leach solution contains carbonate ions, the ion-exchange columns are commonly eluted with an eluant of sodium carbonate/sodium bicarbonate/sodium chloride. To precipitate the uranium values from this type of eluant, the pH of the eluate (i.e., pregnant eluant) is first adjusted to between 1 and 2 to decompose the uranyl carbonate complex in the eluate causing $CO_2$ to be expelld from the eluate. Hydrogen peroxide ($H_2O_2$) is added to oxidize the $UO_2^{+2}$ to $UO_4.XH_2O$ which, in turn, precipitates as "yellowcake" and is recovered as the desired product of the operation. The solution is readjusted to pH of 3 to 5 to assure complete precipitation of yellowcake. The barren eluate, now stripped of its uranium values, is made up with more chemicals to make fresh eluant for future use in the operation.

However, in the above reaction, the exact stoichiometric amount of hydrogen peroxide is sometimes difficult to maintain and excess hydrogen peroxide may inadvertently be added during the precipitation step. Further, excess hydrogen peroxide may be deliberately added in some instances to insure the complete precipitation of a high quality yellowcake product. For whatever reason, the addition of excess hydrogen peroxide in the precipitation step will result in the presence of hydrogen peroxide in the barren eluate which eventually ends up in the fresh eluant. Unfortunately, the quaternary amine, anionic resins used in this type of operation is highly susceptible to oxidative degradation when contacted by hydrogen peroxide. Upon oxidation, the resins lose their functional group and structural integrity and crumble, thereby severely reducing both the effectiveness and the operational life of the resin. Since these resins are a critical part of the operation and are a very high cost item, it is obvious that a need exists for protecting these resins from accidental contact with hydrogen peroxide.

To function satisfactorily in a typical, commercial leach operation, the means used for protecting the resins should (1) be effective at ambient temperatures to lower the hydrogen peroxide to operating levels of approximately 1~2 parts per million; (2) add no additional reagents to the elution circuit which might yield harmful by-products; and (3) be inexpensive, easy to operate, and require no tight control.

SUMMARY OF THE INVENTION

The present invention provides a method and apparatus for recovering uranium and/or related values which include means for protecting the ion-exchange resin rom oxidation due to contact with hydrogen peroxide.

More specifically, a guard chamber is positioned in the elution circuit of the recovery operation so that barren eluant, after it has been stripped of its values by the addition of hydrogen peroxide, will flow through the chamber. The guard chamber contains a catalytic material which will decompose hydrogen peroxide rapidly upon contact into water and oxygen. Examples of catalytic materials which are effective for this purpose are activated carbon and noble metals and other heavy metals, e.g. platinum and palladium, preferably deposited on a base suppot material, e.g. activated carbon.

After the barren solution is passed through the catalytic material in the guard chamber, it is used to make up fresh eluant for the recovery operation with no risk of the fresh eluant causing oxidative degradation of the ion-exchange resins. The action of the catalytic material in decomposing the hydrogen peroxide adds nothing to the eluant which might yield harmful by-products to the operation. Also, the catalytic material is inexpensive, easy to operate, and requires no close control.

DESCRIPTION OF THE PREFERRED EMBODIMENTS

Figure 1:
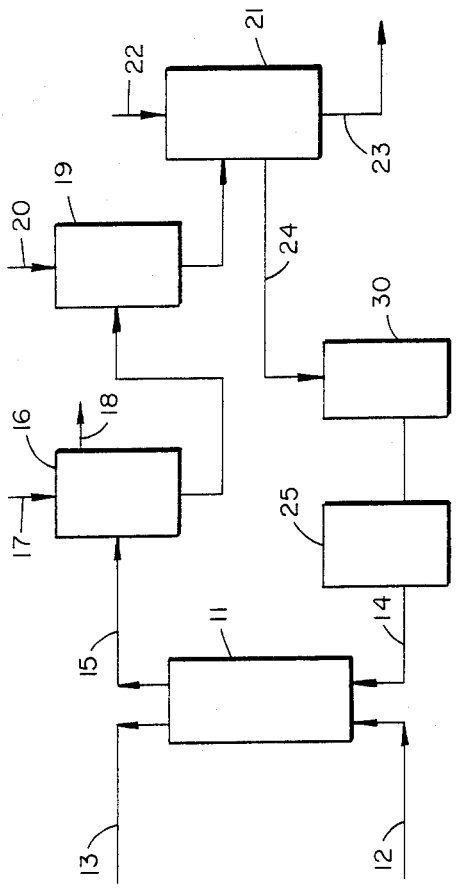
FIG. 1 is a simplified, flow diagram of a typical recovery operation incorporating the present invention.

To better understand the present invention, reference will now be made to FIG. 1 to describe a typical, well-known uranium recovery process in which the present invention is incorporated. A leach solution, which has previously been passed through uranium ore (not shown) to dissolve uranium values therefrom, is flowed from line 12, upward through column 11, and out line 13. Column 11 contains an anionic, ion-exchange resin (e.g. quaternary amine resin) which adsorbs the uranium values from the leach solution.

When column 11 is sufficiently loaded with uranium values, the flow of leach solution is switched to another column (not shown). Eluant, e.g. an aqueous solution of sodium carbonate/sodium bicarbonate/sodium chloride, is then flowed from line 14, upward through column 11, and out line 15. As is well known, the eluant will desorb the uranium from the resin and will carry the values from column 11.

In the illustrated recovery process, the eluate (i.e., pregnant eluant) flows to tank 16 where its pH is adjusted to a value of 1-2 by adding an acid, e.g. HCl, through line 17. This lowering of pH causes decomposition of the uranyl carbonate complex and carbon dioxide product to be expelled from the eluate and the carbon dioxide is exhausted from tank 16 through line 18. The eluate is then flowed from tank 16 to a second tank 19 where hydrogen peroxide solution is added through line 20 to oxidize the uranyl ions to "uranium peroxide". Eluant from tank 19 then flows to tank 21 where caustic solution is added though line 22 to adjust pH to 3-5 to complete yellowcake precipitation.

As is known, the hydrogen peroxide oxidizes the uranium values, i.e., $UO_2^{+2}$, in the acidified eluate to an insoluble compound (i.e., $UO_4 \cdot XH_2O$) in accordance with the following equation:

$$UO_2^{+2} + H_2O_2 + XH_2O \rightarrow UO_4 \cdot XH_2O \downarrow + 2H^+$$

The precipitate ($UO_4 \cdot XH_2O$) commonly called "yellowcake" is removed from tank 21 through line 23 for further processing.

Normally, the eluate, after the uranium values have been removed (now called decant solution), is returned through line 24 to mixing tank 25 where the required chemicals are added to make up fresh eluant for reuse in the process. However, in most known commercial processes of this type, any excess hydrogen peroxide not consumed in the precipitation step will remain in the decant solution during the making up of fresh eluant and will be carried into column 12 during subsequent elution cycles. Since a large number of the actual resins used in this type of commerical operation are anionic resins of the quaternary amine type, they are highly susceptible to oxidative degradation. Any hydrogen peroxide in the eluant will oxidize the resins thereby causing the resins to lose their functional group and structural integrity and crumble. This obviously severely reduces both the effectiveness and the operational life of the resin. Since these resins are a high cost item in this type of process, it is vitally important to protect the resins from contact with hydrogen peroxide.

In accordance with the present invention, a guard chamber 30 is positioned in the flowpath of the decant solution between precipitation tank 21 and mixing tank 25. Guard chamber 30 is filled with a catalytic material which is effective to decompose hydrogen peroxide upon contact into water and oxygen, neither of which is harmful to the resin.

Any catalytic material which is effective to decompose hydrogen peroxide can be used but to be commercially attractive the catalytic material should (1) be effective at room temperature and be capable of lowering the hydrogen peroxide to acceptable levels, e.g. 1-2 parts per million (ppm); (2) involve no addition of reagents nor itself give up any impurities to the eluant which will yield harmful by-products; (3) should be inexpensive, easy to operate, and require no tight control; and (4) remain both chemically and physically stable over a long operating life.

It is well known that hydrogen peroxide can be catalytically decomposed by heavy metals, e.g. chromium, nickel, iron, platinum, palladium, vanadium, molybdenum et al. However, when considering the nature of the decant solution in a commercial uranium leach operation, the noble metals of platinum and palladium are preferred since the other base metals named above might be quickly leached into the solution. To prepare a satisfactory catalytic material which contains either platinum or palladium it is desirable to use these metals in combination with a solid, inert porous base support material which also has a long term stability in the presence of the decant solution. Examples of such a base support material are activated carbon and alumina onto which the platinum or palladium can be deposited to form catalytic materials for use in the present invention.

Although a metal deposed on a solid base support material forms an excellent catalytic material, it has been found unexpectedly that activated carbon, by itself, also is effective as a catalytic material in decomposing hydrogen peroxide in the present invention. It is not fully understood whether the activated carbon initially has sufficient metal contamination to provide the necessary catalytic properties or if it quickly obtains these properties by adsorbing metals, e.g. molybdenum, vanadium, iron, and/or uranium which are normally present in some quantities in the decant solution. In any event, experiments have shown activated carbon to be an effective material. To better illustrate the present invention, reference is now made to the following experimental work.

A simulated decant solution having the following composition was prepared.

| Component | ppm |
|---|---|
| $H_2O_2$ | 100 |
| $Cl^-$ | 35,000 |
| $SO_4^=$ | 9,600 |
| $Na^+$ | 25,000 |
| Mo | 30 |
| $Na_2S_4O_6$ | 50 |
| pH | 4 |

The pH of the solution was adjusted to 4 to simulate the condition at which the eluant leaves precipitation tank 21 and to minimize the $H_2O_2$ decomposition at that point.

Ten cc of the selected catalytic material were loaded in the glass reactor as a fixed bed. The decant solution was pumped upflow through the bed at room temperature. The flow rate was varied from 1 to 11 Liquid Hourly Space Volume (LHSV). Instantaneous feed and product samples were taken at the inlet (after the pump) and outlet of the reactor, respectively, and titrated for $H_2O_2$ content using ceric sulfate as the oxidant and Ferron as the indicator. From these analyses, the percentage of $H_2O_2$ decomposition was calculated.

Figure 2:
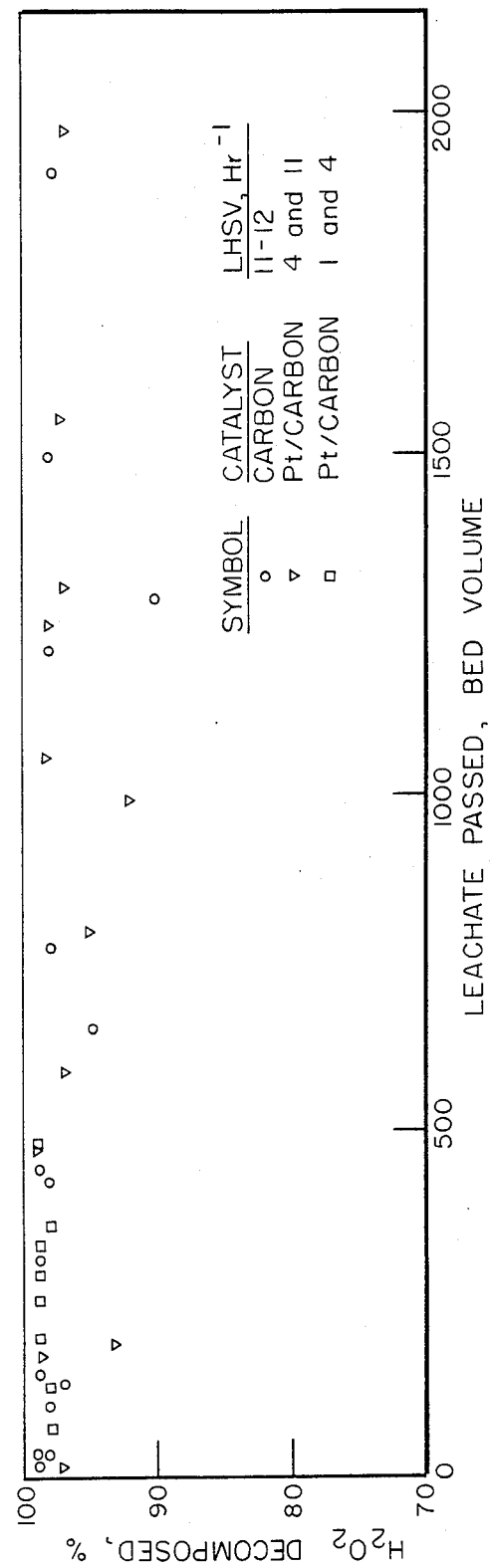
FIG. 2 is a graph summarizing experimental data in accordance with the present invention.

The results are presented in FIG. 2 by plotting the percentage of $H_2O_2$ decomposition against the bed volume of feed solution passed over the catalytic bed. The two catalytic materials tested were:

(1) Activated carbon, type PCB (12×30 mesh) obtained from Pittsburgh Activated Carbon, Division of Calgon Corporation, and (2) Pt/carbon (32×80 mesh) contains 0.93 wt% Pt.

The catalysts carbon and Pt/carbon, both are effective in decomposing $H_2O_2$ from 100 ppm to 1~2 ppm level at room temperature (FIG. 1). This high level of conversion is achieved at pH of 4 where $H_2O_2$ is most stable. Because of its cost, activated granular carbon is clearly the preferred catalyst. As stated above, it is not clear whether the activated carbon itself is the catalyst or it acts as the adsorbent to pick up the heavy metals resulting in the formation of an in-situ metal catalyst.

As shown in FIG. 2, products with 1-2 ppm of $H_2O_2$ are obtained at an LHSV as high as 11. Testing at higher LHSV was not possible due to the physical limitations of the apparatus. However, from the collected data, it can be calculated that only a small amount of catalytic material is necessary even for large commercial operations. Therefore, the cost of providing protection for the expensive ion-exchange resin is de minimus in a commercial operation.

Over 2,000 bed volumes of the simulated decant solution were passed over the catalytic material without any apparent aging of the catalytic material. In view of the nature of the catalytic material and reaction involved, it can be expected that the catalytic material will remain active indefinitely, or until physical plugging or other limitations set in. Since carbon is such a good adsorbent, it will adsorb various compounds and metals, particularly molybdate, so that the pores of the carbon may eventually fill up, leading to loss of surface area and hence catalytic activity. However, if the carbon becomes fouled, it can be regenerated by washing with caustics and acids of moderate concentration. Since the cost of the carbon is so low, regeneration might not be worthwhile. If the carbon is regenerated, any molybdate adsorbed thereon can be recovered for sale, if desired.

Some decant solution in commercial use may also contain compounds which may be likely poisons for the selected catalytic materials. One of the most detrimental compounds is polythionate. Consequently, 50 ppm of $Na_2S_4O_6$ was added to the simulated decant solution and, as shown in FIG. 2, the catalytic materials functioned well for long periods of time without evidence of deactivation. From this data, it is concluded that the catalytic materials will not be poisoned by the compounds normally found in typical decant solutions.

From the above, it can be seen that the present invention provides an inexpensive means for protecting the vital and expensive ion-exchange columns in a uranium leach process from oxidative degradation due to the presence of hydrogen peroxide in the fresh eluant. It is noted that even in operations where the hydrogen peroxide is strictly controlled and/or monitored to prevent excess hydrogen peroxide from being retained in the decant solution, the present invention still has application, since it provides cheap, reliable insurance against inadvertence, accident, or mistake which might otherwise destroy the expensive resins.

We claim:

1. In an apparatus for recovering values including means supplying a leach solution containing said values to at least one column filled with ionexchange resin, means for supplying eluant through said column to desorb said values from said resins, means for precipitating said values from said eluate upon addition of hydrogen peroxide, and means for making up fresh eluant from the decant solution which exists after said precipitation of said values, the improvement comprising:
    a chamber positioned between said means for precipitating said values and said means for making up fresh eluant through which said decant solution flows; and
    catalytic material in said chamber decomposing substantially all of any hydrogen peroxide that may be present in said decant solution into water and oxygen.

2. The apparatus of claim 1 wherein said catalytic material comprises:
    activated carbon.

3. The apparatus of claim 1 wherein said catalytic material comprises:
    platinum deposited on an inert, porous base material.

4. The apparatus of claim 1 wherein said catalytic material comprises:
    palladium deposited on an inert, porous base material.

5. The apparatus of any one of claims 1, 2, 3 or 4 wherein said apparatus is for recovering uranium values.

* * * * *